(12) United States Patent
Hamalainen et al.

(10) Patent No.: US 8,774,791 B2
(45) Date of Patent: Jul. 8, 2014

(54) METHOD OF IMPROVING COVERAGE AND OPTIMISATION IN COMMUNICATION NETWORKS

(75) Inventors: Seppo Olavi Hamalainen, Espoo (FI); Haitao Tang, Espoo (FI); Achim Franz Wacker, Espoo (FI); Osman Nuri Can Yilmaz, Helsinki (FI)

(73) Assignee: Nokia Siemens and Networks Oy, Espoo (FI)

( * ) Notice: Subject to any disclaimer, the term of this patent is extended or adjusted under 35 U.S.C. 154(b) by 284 days.

(21) Appl. No.: 13/127,771

(22) PCT Filed: Nov. 5, 2008

(86) PCT No.: PCT/EP2008/065001
§ 371 (c)(1),
(2), (4) Date: May 5, 2011

(87) PCT Pub. No.: WO2010/051838
PCT Pub. Date: May 14, 2010

(65) Prior Publication Data
US 2011/0212720 A1    Sep. 1, 2011

(51) Int. Cl.
*H04W 24/00*    (2009.01)

(52) U.S. Cl.
USPC ....... 455/423; 455/513; 455/456.5; 455/63.1; 370/522; 379/220.01

(58) Field of Classification Search
USPC .......... 455/446; 370/352, 216, 522, 401, 410; 379/220.01, 230, 396, 231; 709/227, 709/217
See application file for complete search history.

(56) References Cited

U.S. PATENT DOCUMENTS

| | | | |
|---|---|---|---|
| 6,438,381 B1 * | 8/2002 | Alberth et al. | 455/456.5 |
| 6,654,608 B1 * | 11/2003 | Monell et al. | 455/436 |
| 7,499,718 B2 * | 3/2009 | Stephenson et al. | 455/513 |
| 8,260,322 B2 * | 9/2012 | Allen et al. | 455/456.5 |
| 2004/0203441 A1 * | 10/2004 | Smith | 455/67.11 |
| 2006/0068717 A1 * | 3/2006 | Gandhi et al. | 455/67.13 |
| 2007/0243864 A1 * | 10/2007 | Jaquet | 455/423 |
| 2008/0076359 A1 * | 3/2008 | Charpentier et al. | 455/63.1 |
| 2008/0153501 A1 * | 6/2008 | Harris et al. | 455/446 |

FOREIGN PATENT DOCUMENTS

| | | |
|---|---|---|
| EP | 1 475 982 A1 | 11/2004 |
| GB | 2 423 217 A | 8/2006 |
| WO | WO 00/65742 | 11/2000 |
| WO | WO 2008/016799 A2 | 2/2008 |

* cited by examiner

*Primary Examiner* — Mahendra Patel
(74) *Attorney, Agent, or Firm* — Harrington & Smith

(57) ABSTRACT

A method and apparatus for detecting and determining the location of a coverage hole in a communications network such as a cellular communication system wherein the location is determined from operational parameters and/or by network elements themselves. Additionally is a method to reduce a hole by adjusting antennae parameters preferably remotely and automatically and this can be done in conjunction with hole location to optimise the system.

20 Claims, 4 Drawing Sheets

METHOD OF IMPROVING COVERAGE AND OPTIMISATION IN COMMUNICATION NETWORKS

FIELD OF INVENTION

The invention relates to communication networks and in particular to methods to detect and locate holes in coverage in a communication network. The invention also relates to method to recover performance, i.e. eliminate or reduce such a hole as well as optimisation of a system.

BACKGROUND OF INVENTION

Cellular communication networks typically comprise a network of base stations, each covering a certain geographic area (cell). Communication occurs usually between base stations and user equipment under the general control of a network controller and network managed from element management system (EMS) or network managements system (NMS). In this way, planners can locate base stations so as to operate in a way that provides coverage for particular populations within the context of a wider geographical area.

The invention has particular, but not exclusive application to self-organising networks (SON) using 3GPP (3rd Generation Partnership Project) and NGMN (Next Generation Mobile Networks). Coverage hole detection recovery is a use case in 3GPP and NGMN. Use case is about automatic detection of coverage holes in the network and automatic fixing of the hole.

The optimum coverage areas of cells may change for various reasons. On-going urbanisation, for example, may lead to holes developing in a cellular network. Other factors which lead to necessary changes that have to be made in order to optimise a cellular system include addition of new base stations, or when a base station malfunction occurs or if planning was suboptimum. Below optimal coverage leads to waste of network resources and lower quality of service (QoS).

In order to detect such holes in a cellular network, the prior art approach was to perform an expensive standardised drive test to detect possible coverage holes.

It is to be noted that in general the term "hole" is to be construed in general terms; at one extreme may be considered as a total loss of communication connectivity at a particular location. However it may be considered as a reduction in the quality of connectivity at a particular location within a network.

Active Antenna Systems (AAS) is a technology which provides improved system performance and radio network capacity as well as being a candidate to decrease radio site installation and operating costs. AAS systems had been technically challenging to implement, but recently most of the technical obstacles have been overcome. Adaptive antennas provides beam-forming capability using various parameters such as number of active antennas on horizontal or vertical plane, amplitude and phase of an antenna element, and average power so that antenna beam are able to be rotated, tilted, and formed electrically.

A sub-form of AAS is a so-called remote antenna tilt (RET), in which only antenna down-tilt is altered electrically. The methods described in the present invention can be applied to RET as well.

An aim of the embodiments is to provide a method of detecting the existence and location of holes in a communication network. A further aim is to provide a method of fixing or improving such a coverage hole. Yet a further aim is to optimise the performance of a communication network.

STATEMENT OF THE INVENTION

In a first aspect of the invention there is provided a method for detecting and determining the location of a coverage hole in a communications network, wherein said location is determined from operational parameters and/or by network elements themselves.

The hole may be located in the vicinity of, or between one or more operatively adjacent base stations of said network. The network may be a cellular communication network.

In one embodiment the hole may be determined from detecting one or more radio link failures. In a preferred embodiment it may be determined there is a hole located between two or more particular adjacent base stations if radio link failures increase in said two or more particular adjacent cells.

In one embodiment the radio link failure(s) may be detected by user equipment, and said user equipment sending information concerning said RLF to at least one other element of said communication system.

The information includes may include positional information, determined from GPS or triangulation techniques.

In one embodiment the operational parameters are handover or QoS statistics. In a preferred embodiment using these, it may be determined that there is a hole in the vicinity of, or between one or more base stations, if the frequency of handovers or QoS statistics associated with said one or more base stations is statistically significantly less than expected. Additionally it may be determined there is a hole located between two or more operatively adjacent cells if the frequency of handovers or QoS statistics associated with said two or more cells is significantly less than expected.

The operational parameters may be any of handover failure statistics, SINR, CQI, RX from power levels from eUE and or eNB.

In preferred embodiments, the operational parameters are received from User Equipment or Node Bs The method may be performed by a base station/node B, a network controller, element management systems or network management system.

The determining is preferably performed remotely and or automatically.

According to a second aspect of the invention there is provided a method of reducing or eliminating a hole in, or optimisation of, a communication network having one or more base stations comprising remotely modifying radio patterns of one or more antennae of said one or more base stations.

This is preferably performed remotely and/or automatically.

Preferably the method includes determining changes in network performance as a result of said modification.

Preferably the communications network includes an Adaptive Antenna System or remote electrical antenna tilt. Modifying radio patterns may comprise changing one or more of tilt, gain, beam-width, horizontal or vertical radio patterns of one or more antennae.

According to a third aspect of the invention there is provided a computer readable medium comprising a computer program thereon, said computer program performing any of the methods according to the invention.

According to a fourth aspect of the invention there is provided an apparatus having means to detect or determine the location of a coverage hole in a communications network from operational parameters and/or from or data from network elements of said communication network.

According to a fifth aspect of the invention there is provided a network element of a communication network, having means to detect and/or to send data pertaining to hole in said communications network to one or more other network elements.

According to a sixth aspect of the invention there is provided an apparatus to adapted to eliminate or reduce a coverage hole in, or optimise a communication network, said network having one or more base stations comprising means to modify radio patterns of one or more antennae of said one or more base stations.

SUMMARY OF FIGURES

For a better understanding of the present invention and how the same may be carried into effect, reference will now be made by way of example only to the accompanying drawings in which.

Figure 1:
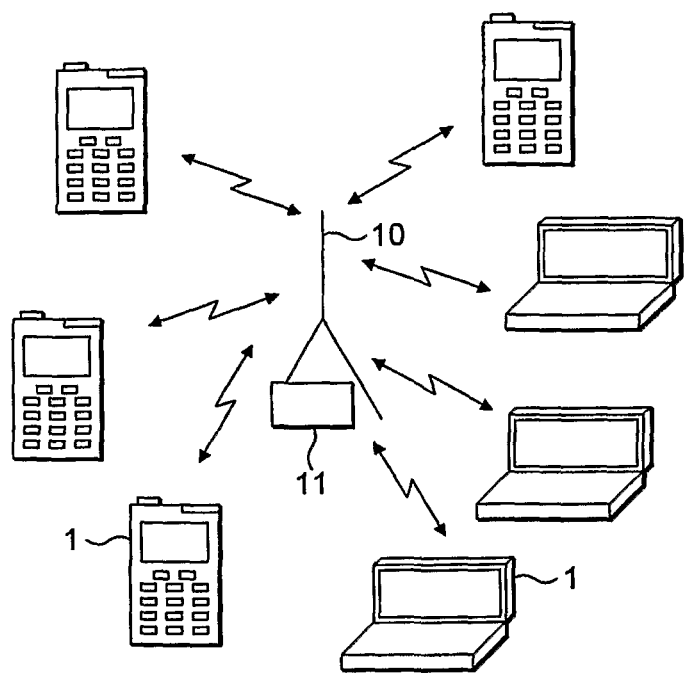
FIG. 1 shows a schematic presentation of a communication system wherein the invention may be embodied.

Before explaining in detail a few exemplifying embodiments, a brief explanation of wireless access is given with reference to FIG. 1 showing a communication system providing wireless communications to a plurality of communication devices 1. A communication device 1, for example a mobile user device or equipment, can be used for accessing various services and/or applications provided via the wireless communication system. A communication device can typically access wirelessly a communication system via at least one wireless transmitter and/or receiver node 10 of an access system. Non-limiting examples of access nodes are a base station of a cellular system, for example a 3G WCDMA Node B, a enhanced Node B (eNB) of 3GPP LTE (long term evolution), a base station of a wireless local area network (WLAN) and a satellite station of a satellite based communication system. The communication devices 1 may also communicate directly with each other.

The communications may be arranged in various manners based on an appropriate radio access technology or technologies. The access is provided via radio channels also known as access channels. Each communication device 1 may have one or more radio channels open at the same time. Each communication device may be connected to more than one base station 10 or similar entity. Also, a plurality of communicate devices may communicate with a base station or similar, and/or attempt to access the communication system via the same base station. A plurality of communication devices may also share a channel. For example, to start communications or to connect to a new access system, a plurality of communications devices may attempt to make the initial contact via a single channel, for example via a random access channel (RACH). The attempts to access may be made substantially at the same time.

The base station 10 of the access system can be connected to other parts of the communication system via appropriate connections, for one or more appropriate gateway nodes. These are not shown for clarity. A base station is typically controlled by at least one appropriate controller apparatus (this is true for GSM and WCDMA. However in LTE and WiMAX there is no controller anymore, but control functionality is distributed to appropriate network elements such as general access nodes, base stations, nodeB's, eNBs, AP's) generally denoted by 11 in FIG. 1. The controller apparatus 11 can be provided for managing of the operation of the base station and/or communications via the base station. The controller apparatus is typically provided with memory capacity and at least one data processor. Various functional entities may be provided in the controller by means of the data processing capability thereof. The functional entities provided in the base station controller may provide functions relating to radio resource control, access control, packet data context control, relay control and so forth.

Network elements, such as base stations 10 are managed by using network management operations support system (OSS). OSS's role is to supporting processes such as maintaining network inventory, provisioning services, configuring network components, and managing faults. OSS architecture is based on four layers: Business Management Level (BML), Service Management Level (SML), Network Management Level (NML), Element Management Level (EML). Network elements can be managed from network management system (NMS) or element management system (EMS). Base stations 10 are connected to NMS over open Itf-N (so called northbound interface) or to EMS over proprietary Itf-S interface (southbound interface).

A communication device 1 can be used for various tasks such as making and receiving phone calls, for receiving and sending data from and to a data network and for experiencing, for example, multimedia or other content. For example, a communication device may access applications provided via a telephone network and/or a data network, such as applications that are provided based on the Internet Protocol (IP) or any other appropriate protocol. An appropriate mobile communication device may be provided by any device capable of at least sending and/or receiving wireless signals from the access system. Non-limiting examples include a mobile station (MS) such as a mobile phone or a smart phone, a portable computer provided with a wireless interface card or other wireless interface facility, personal data assistant (PDA) provided with wireless communication capabilities, or any combinations of these or the like.

Figure 2:
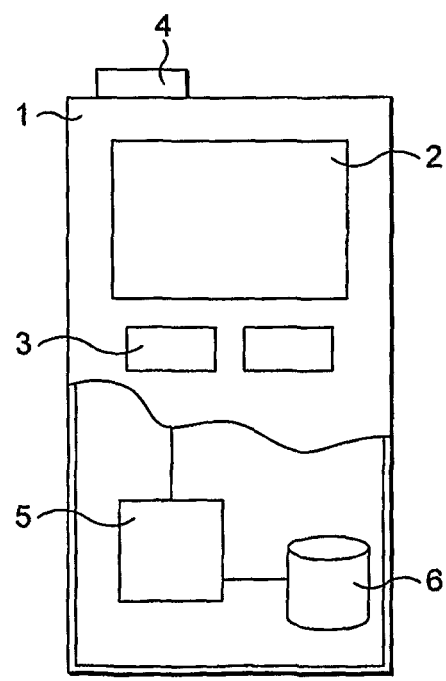
FIG. 2 shows a sectioned view of communication device.

As shown in FIG. 2, a communication device 1 is typically provided with appropriate data processing apparatus, such as at least one data processor 5. At least one memory device 6 is also typically provided. The data processing and storage entities can be provided on an appropriate circuit board and/or in chipsets. Different functions and operations may be provided by different chips. Alternatively, at least partially integrated chips may be used. Antenna means 4, a display 2, and/or a keypad 3 may also be provided.

DETAILED DESCRIPTION OF EXEMPLARY EMBODIMENTS

The invention includes detecting and/or determining the location of a hole in a communication network, (such as, but not limited to a cellular communication network) from operational parameters or by elements of the network itself. This obviates the need for intervention of personnel or the application of specialist equipment. The location of any holes may be performed automatically and generally by the system itself. There will now be described various aspects and embodiments of the invention but the invention is not limited to these.

Detection of Coverage Holes

Figure 3:
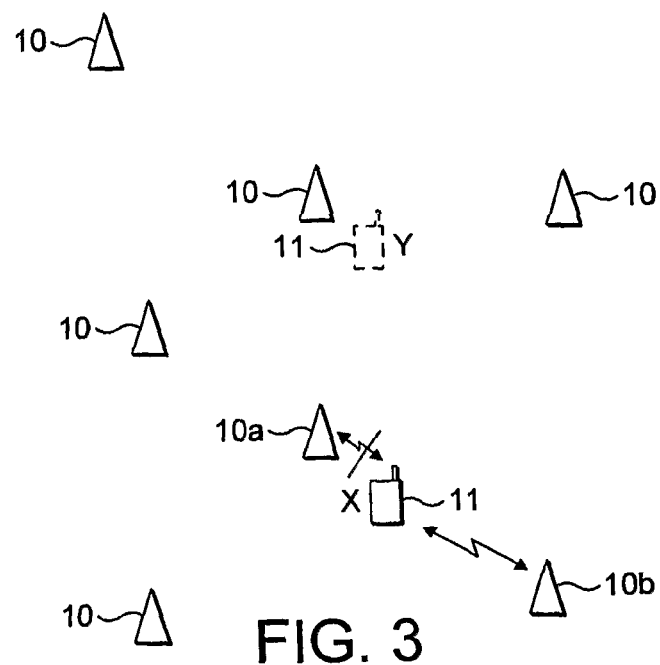
FIG. 3 shows part of a communication system illustrating one embodiment of the invention.

In one embodiment of the invention, a coverage hole in a communication network such as a cellular network may be detected from determining a radio link failure (RLF) or a broken connection at a certain location. FIG. 3 shows a schematic representation illustrating how such an embodiment may work. A cellular network is shown comprising several base stations 10 scattered geographically. In one embodiment such a hole may be detected by mobile station 11, i.e. User Equipment (UE) at a location X within a cellular network in the vicinity of particular base station 10a, and between base stations 10a and 10b. At this point the User Equipment fails to maintain a connection with the network. The User Equipment can estimate or obtain the geographical position where it detects a hole; i.e. at location X. This may be performed in one embodiment by the User Equipment having GPS functionality or by using techniques such as triangulation of received signal from several base stations. When the UE is connected subsequently to the network, for example at location Y shown in the figure by the dotted line, it may report data concerning the location where the radio link failure occurred to the base station. The UE may therefore in one embodiment store information until coverage has e.g. been re-established or the UE is moved to an area where coverage is again possible. UE then sends the collected information about RLFs and the respective location. In a preferred embodiment this may be the idle mode to the base station but is not limited to this.

In accordance with another embodiment, if a radio failure link is detected in two or more adjacent cells, (in other words between User Equipment and two adjacent access nodes e.g. base stations/node Bs) then it may be assumed than there is a coverage hole located between those two or more cells (i.e. between those base stations). With reference to FIG. 3 again, if the a radio link failures were detected by a User Equipment with respect to base stations 10a and 10b, it may be determined in one embodiment that there was a hole located between them. In order to get more reliable estimation, statistics, such as number of RLF, may be collected in adjacent base stations. If the amount of RLF or probability of RLFs exceed certain threshold in adjacent base station there is a coverage hole between base stations.

Therefore, in certain embodiments, information relating to radio link failures relating to multiple cells may also be used to determine the hole location, via for example element management system, network management system or X2 links connecting eNBs to each other.

Again the User Equipment (or base stations) may in certain embodiments have means to determine position such as triangulation or GPS means.

The information pertaining to the hole from the User Equipment may in one embodiment be received by one or more Node B's which detect, determine and/or record the location of the hole locally, or in one other embodiment all data are forwarded to a network controller or a designated unit, such as EMS or NMS, which may be tasked to determine the location of the hole from the data.

A further embodiment will now be described with reference to FIG. 4. In operation of current cellular systems, when a mobile station moves from one location to another, "handover" occurs between two base stations. In other words hand-over occurs as the mobile station moves out of the cell covered by base station A, for example, to that cell area covered by base station B. Handover statistics are routinely compiled by cellular communication systems. According to one embodiment handover statistics between one, a pair or more base stations/cells may be analysed and used to locate coverage holes. With reference to the figure, if there are less handovers associated with base station 10c, then there it may be determined to be a hole associated with the cell shown by the dotted line 13. In an alternative embodiment if there are more handover failures associated with a particular base station, then it may be determined there is a hole associated with that particular base station. The handover data may be obtained from Node B's or User Equipments or a combination of both.

Again the User Equipment stations may have means to determine position such as triangulation or GPS means, and such positional data may be used in conjunction with the handover data.

Figure 4:
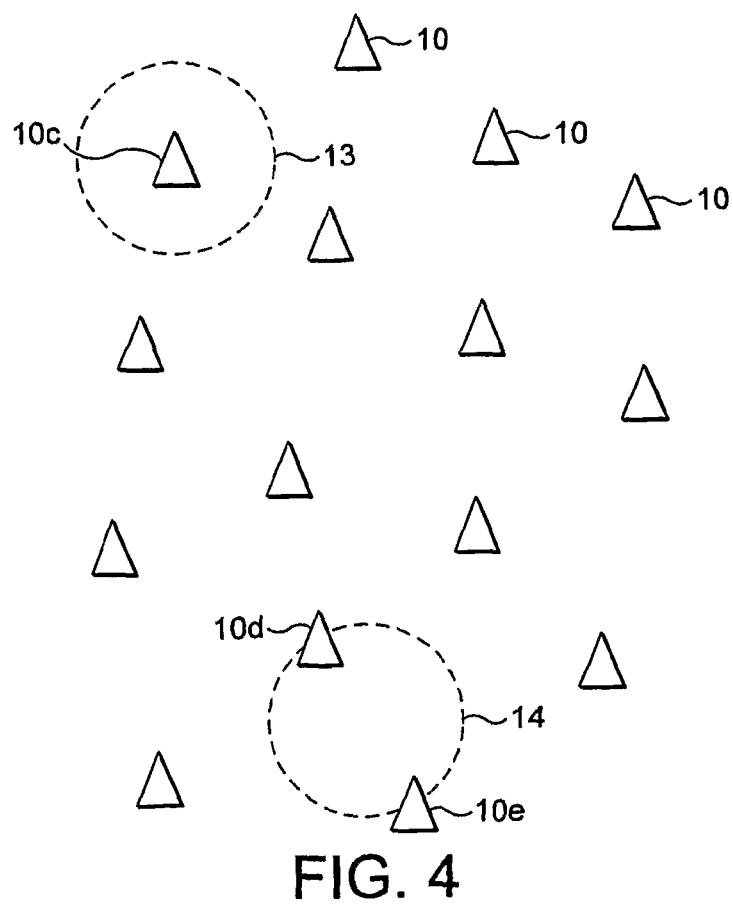
FIG. 4 shows part of a communication system illustrating other embodiments of the invention.

FIG. 4 also shows another similar embodiment. If for example, less handovers occur between two adjacent cells than expected, this may be used to indicate that there is a high probability of a coverage hole between the two cells. Where the handover statistics show that there is significantly less handovers in association with both base stations 10d and 10e, then it may be determined that there is a coverage hole in the region 14 shown by the dotted line between the base stations.

In an alternative embodiment, Quality of Service (QoS) statistics from cells/node Bs are collected and the data collected may be used to determine coverage holes in the vicinity of a base station or between adjacent base stations (cells). Quality of Service statistics are routinely compiled in cellular communication systems. In a particular embodiment, if certain QoS targets in one, two or more base stations/cells are not met, it may be determined that there is a coverage hole in the region of a base station or between these two or more base stations/cells.

Again QoS data may be collated from User Equipment or base stations/Node B's. Again these data may be used locally by one or more node B's to determine or record the hole location. As an alternative, data may be forwarded to a network controller or to a unit tasked to determine the location from data.

Again the User Equipment may have means to determine position such as triangulation or GPS means, and such positional data, which may be used in conjunction with the handover data, QoS, Radio Link Failure or other such data. Positional data with regard base stations (which are generally not mobile) may be pre-stored at any convenient location in the network e.g. the Node B itself or network controller. In some circumstances Node B's may also have means to determine their own position.

The invention is not limited to these examples and embodiments. Other data can also be used in other embodiments. These data may include SINR (signal to noise plus interference ratio), CQI (channel quality indicator), RX (receiver) power levels from eUE and or eNB may be collected. Significant changes associated with a single base station or changes associated with two or more neighbouring cells will flag coverage holes.

Coverage Hole Recovery

In accordance with another aspect of the invention is a method of recovery of a hole. The location of the hole may be determined by any suitable means including but not limited to any of the methods describe above. It should be understood that a hole may just be considered as particular link having degraded performance.

Figure 5A:
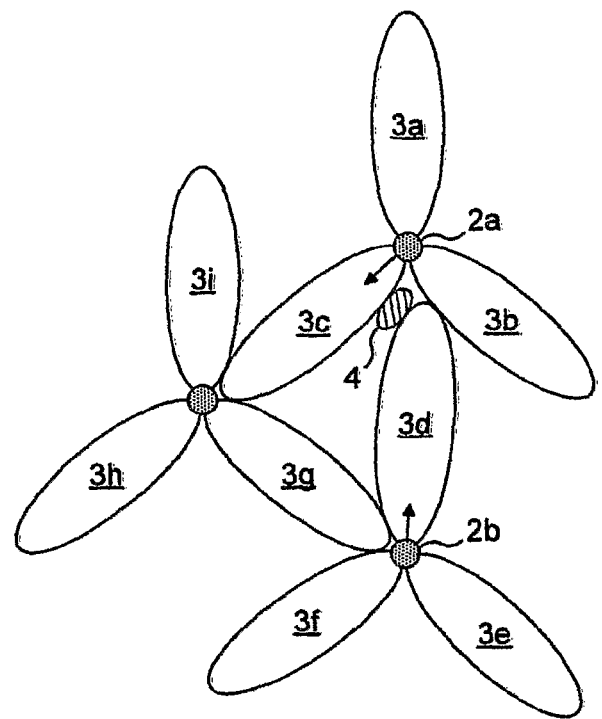
FIGS. 5a and 5b shows part of a communication system illustrating how one embodiment of the invention can be implemented.
Figure 5B:
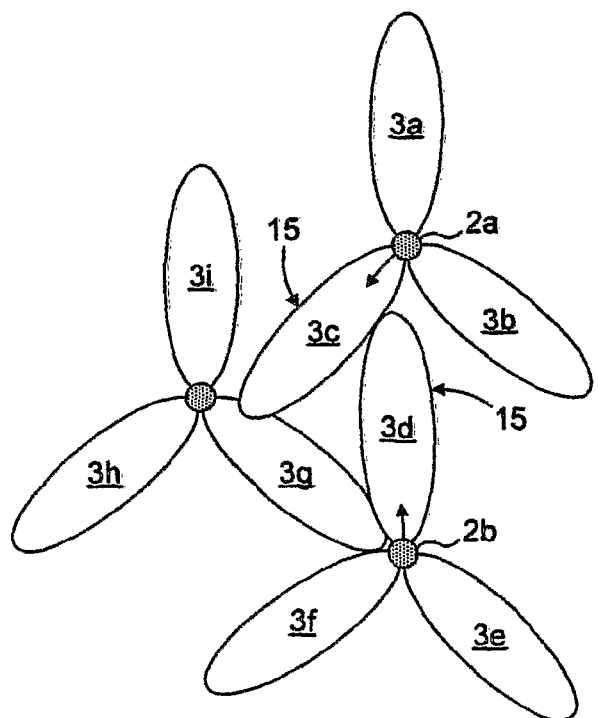

FIGS. 5a and 5b represent a schematic plan view showing a cellular network 1 comprising a number of base stations 2a, 2b and 2c and a number of coverage areas (3a, 3b, 3c, 3d, 3e, 3f, 3g, 3h and 3i) which represent areas where signals can be received or transmitted to and from User Equipment with respect to a particular base station. Such coverage areas may thus be regarded as beams representing areas where signals either from the base station can be received (by e.g. User Equipment) and/or where signals (from User Equipment) can be received by the base station.

As can be seen from FIG. 5a, a coverage hole 4 exists wherein User Equipment located at gap 4 cannot communicate with base station 2a or base station 2b. This is due the coverage hole between areas 3c and 3d. Arrows in FIG. 5a show the directivity of the beams associated with the adjacent base stations 2a and 2b.

The coverage hole is detected and located. Again this may be by a method described above. In one embodiment the horizontal radio patterns (or vertical radio beam pattern or the combination of horizontal and vertical patterns) of the system may be consequently adjusted such that changes are made to the horizontal beam steering of base station. In a preferred embodiment this is done automatically i.e. without intervention of a technician. Adjustment may also be performed remotely. The term "remotely" means control of the antenna parameters may be performed remote from the base station/Node B. In one example shown, changes are made to the horizontal directivity/beam pattern of communication from base station 2b to base station 2a, such as to effectively rotate the directivity of the base station beams as seen by the arrow in the figure.

The invention also covers the optimisation of a communication network having one or more base stations comprising remotely modifying radio patterns of one or more antennae of said one or more base stations. In certain embodiments parameters of one or more antennae in one or more base stations in a communication system may be adjusted, for example as described above but not limited to this, and the performance of the communication systems assessed. This may be used to adjust said parameters to optimise the system performance. Incremental changes may be made to any or several antennae parameters, and feedback from system performance parameters are used to make, stop or reverse incremental changes to said antennae parameters, so as to optimise the performance of part or the whole of the communication system.

In one embodiment of this aspect of the invention, horizontal directivity (or any number of antennae parameters) of one or more antennae of one or more base stations/node B's can be adjusted in stepwise manner i.e. in increments. The performance of the system may be then evaluated according to actual measurements following the step change. If such a measurement shows that the adjustment had a positive effect on the performance; a further incremental adjustment in the same direction can take place. If the adjustment however results in decreased performance measurement, the adjustment can be reversed or stopped. Changing other parameters instead or in addition may also be tried. Various techniques of changing parameters to optimise link performance would be clear to the skilled control engineer and where the effects of changing several parameters are complex, matrix, iterative numerical methods or other widely known techniques can be used.

The various antenna parameters which may be used to remove a hole or varied to optimise a network include but are not limited to any one or more of the following: tilt, gain, beam-width, horizontal or vertical radio patterns of one or more antennae and of one or more base stations.

Figure 6:
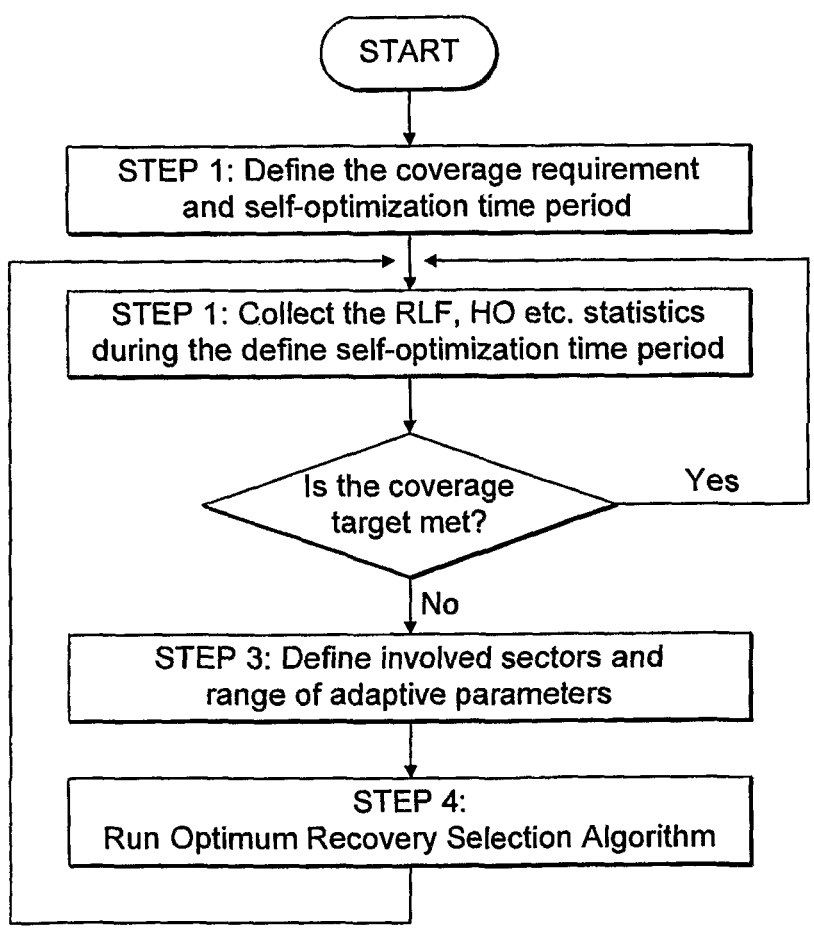
FIG. 6 shows a flowchart in accordance with certain embodiments.

FIG. 6 shows a flow diagram which represents an example of a method of optimisation of performance of a cellular communication network.

In Step 1 the coverage requirement may be defined. In other words minimum standards of communication performance may be set for the communication network. The context of standards of minimum communication performance will become clearer with reference to later steps. The self-optimisation period may also determined. This term is defined as the period over which measurement of performance parameters is performed.

In Step 2 various data are collected during the defined self-optimisation time period. Such data could be RLF (radio link failure), HO (handover) data, Quality of Service (QoS) Statistics, and/or any other appropriate data.

In Step 3, it may determined whether the target coverage is met. In this step, the collected data are analysed. Generally speaking if the data from step 2 are below a certain threshold limit i.e. if they are statistically significantly below the defined coverage requirements the process moves to step 4. If the data collected at step 2 are within acceptable limits, the process repeats step 2 and will keep on collecting the data and checking to see if they are adequate.

In Step 4, the involved sectors are defined and a range of adaptive parameters are calculated. This means determining the location of holes which in its simplest form may be determining the location of one base station/cell or two or more operatively adjacent base station/cells where there are sub-optimum links. A range of adaptive parameters are then determined such as phase, power, amplitude so that main lobe direction, beamwidths, gain and/or tilt can be adjusted.)

At Step 5 the optimum recovery selection algorithm is run. In this step antenna parameters such as horizontal beam steer is adjusted until the required service coverage (e.g. a percentage level) is achieved, which means the coverage hole(s) has been reduced and parameter such as HO, RLF and QoS are returned to minimal expected levels. In a simple example of how this is done, the antenna parameters are changed in small steps until the requirement are met. Once this has been achieved the process returns to Step 2.

In another example templates of antenna parameter settings may be used and different templates may be used until coverage hole has been recovered.

The invention is not limited to such examples and other methods of optimum recovery selection will be apparent to the skilled control engineer.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method, comprising:
   detecting, and determining a location of, a coverage hole in a communications network, wherein said location is determined based at least in part on operational parameters, where the coverage hole is located in the vicinity of, or between, two or more operatively adjacent base stations of said network, the base stations defining two or more adjacent cells; and
   wherein determination that a coverage hole is located in the vicinity of, or between, said two or more operatively adjacent base stations defining at least two adjacent cells is made based on the occurrence of an increase in radio link failures in the two or more adjacent cells, wherein the detection of a radio link failure is performed by a user equipment, and wherein the user equipment sends information concerning the detected radio link failure to at least one other element of said network.

2. The method as claimed in claim 1, where said information comprises positional information determined from at least one of GPS or triangulation techniques.

3. The method as claimed in claim 1, where said operational parameters comprise at least one of handover or quality of service statistics.

4. The method as claimed in claim 3 wherein the coverage hole is determined to be present in the vicinity of, or between, two or more base stations of said network if the frequency of handovers or quality of service statistics associated with said two or more base stations is statistically significantly less than an expected frequency.

5. The method as claimed in claim 3 where the coverage hole is determined to be present in the vicinity of, or between, two or more operatively adjacent cells if the frequency of handovers or quality of service statistics associated with said two or more operatively adjacent cells is significantly less than an expected frequency.

6. The method as claimed in claim 1 where said operational parameters comprise at least one of handover failure statistics, signal to noise ratio, channel quality indicator and reception from power levels from at least one of a user equipment or a base station.

7. The method as claimed in claim 1 where said operational parameters are received from a user equipment or from a Node B.

8. The method as claimed in claim 1 performed by a base station/node B, a network controller, an element management system or a network management system.

9. The method as claimed in claim 1 where detecting and determining are performed remotely, automatically, or both.

10. An apparatus comprising:
    at least one processor; and
    memory storing computer program instructions for execution by the data processor;
    wherein execution of the computer program instructions by the processor configures the apparatus to detect, and determine a location of, a coverage hole in a communications network, wherein said location is determined based at least in part on operational parameters, where the coverage hole is located in the vicinity of, or between, two or more operatively adjacent base stations of said network, the base stations defining two or more adjacent cells, and where determination that a coverage hole is located in the vicinity of, or between, two or more adjacent base stations providing two or more adjacent cells is based at least in part on determination that radio link failures have increased in the two or more adjacent cells, wherein the detection of a radio link failure is performed by a user equipment, and wherein the user equipment sends information concerning the detected radio link failure to at least one other element of said network.

11. The apparatus as claimed in claim 10, where said operational parameters comprise at least one of handover or quality of service statistics.

12. The apparatus as claimed in claim 10 where said operational parameters comprise at least one of handover failure statistics, signal to noise ratio, channel quality indicator and receiver power levels from at least one of a user equipment or a base station.

13. The apparatus as claimed in claim 10, where said apparatus is comprised of a base station/node B, a network controller, an element management system or a network management system.

14. The apparatus as claimed in claim 10, where said information comprises positional information determined from at least one of GPS or triangulation techniques.

15. The method as claimed in claim 11, where determination that the coverage hole is present is based at least in part on a determination as to whether the frequency of handovers or quality of service statistics associated with said two or more base stations is statistically significantly less than an expected frequency.

16. The method as claimed in claim 11, where determination that the coverage hole is present is based at least in part on a determination as to whether the frequency of handovers or quality of service statistics associated with said two or more operatively adjacent cells is statistically significantly less than an expected frequency.

17. The apparatus as claimed in claim 10 where said operational parameters are received from a user equipment or from a Node B.

18. A non-transitory computer readable medium storing a program of instructions, execution of which by a processor configures an apparatus to at least:
    detect, and determine a location of, a coverage hole in a communications network, wherein said location is determined based at least in part on operational parameters, where the coverage hole is located in the vicinity of, or between, two or more operatively adjacent base stations of said network, the base stations defining two or more adjacent cells, and where determination that a coverage hole is located in the vicinity of, or between, two or more adjacent base stations providing two or more adjacent cells is based at least in part on determination that radio link failures have increased in the two or more adjacent cells, wherein the detection of a radio link failure is performed by a user equipment, and wherein the user equipment sends information concerning the detected radio link failure to at least one other element of said network.

19. The non-transitory computer readable medium as claimed in claim 18, where said operational parameters comprise at least one of handover or quality of service statistics.

20. The non-transitory computer readable medium as claimed in claim 18 where said operational parameters comprise at least one of handover failure statistics, signal to noise ratio, channel quality indicator and receiver power levels from at least one of a user equipment or a base station.

* * * * *